United States Patent [15] 3,678,861
Holbert [45] July 25, 1972

[54] CONVEYOR
[72] Inventor: Dimitry Holbert, Oak Park, Mich.
[73] Assignee: Standard Alliance Industries, Inc., Chicago, Ill.
[22] Filed: Aug. 13, 1970
[21] Appl. No.: 63,392

[52] U.S. Cl. ...........................104/172, 198/181, 198/137
[51] Int. Cl. ...........................................B61b 13/00
[58] Field of Search ..............198/203, 181, 182, 189; 104/172, 25

[56] References Cited

UNITED STATES PATENTS 3,435,780  4/1969  Czarnecki ..................104/172 C
2,685,361  8/1954  Garman......................198/181
2,642,176  6/1953  De Burch....................198/203
802,047  10/1905  Krell........................198/203
1,706,905  3/1929  Stockly.....................198/203

*Primary Examiner*—Richard E. Aegerter
*Attorney*—Harness, Dickey & Pierce

[57] ABSTRACT

A conveyor chain for conveyor cars and the like having a plurality of rollers for engagement with guide rails for the chain and a plurality of members carried by the chain having at least one substantially flat surface extending laterally of the chain adapted to be engaged by a chain driving member.

5 Claims, 5 Drawing Figures

Patented July 25, 1972
3,678,861
2 Sheets-Sheet 1
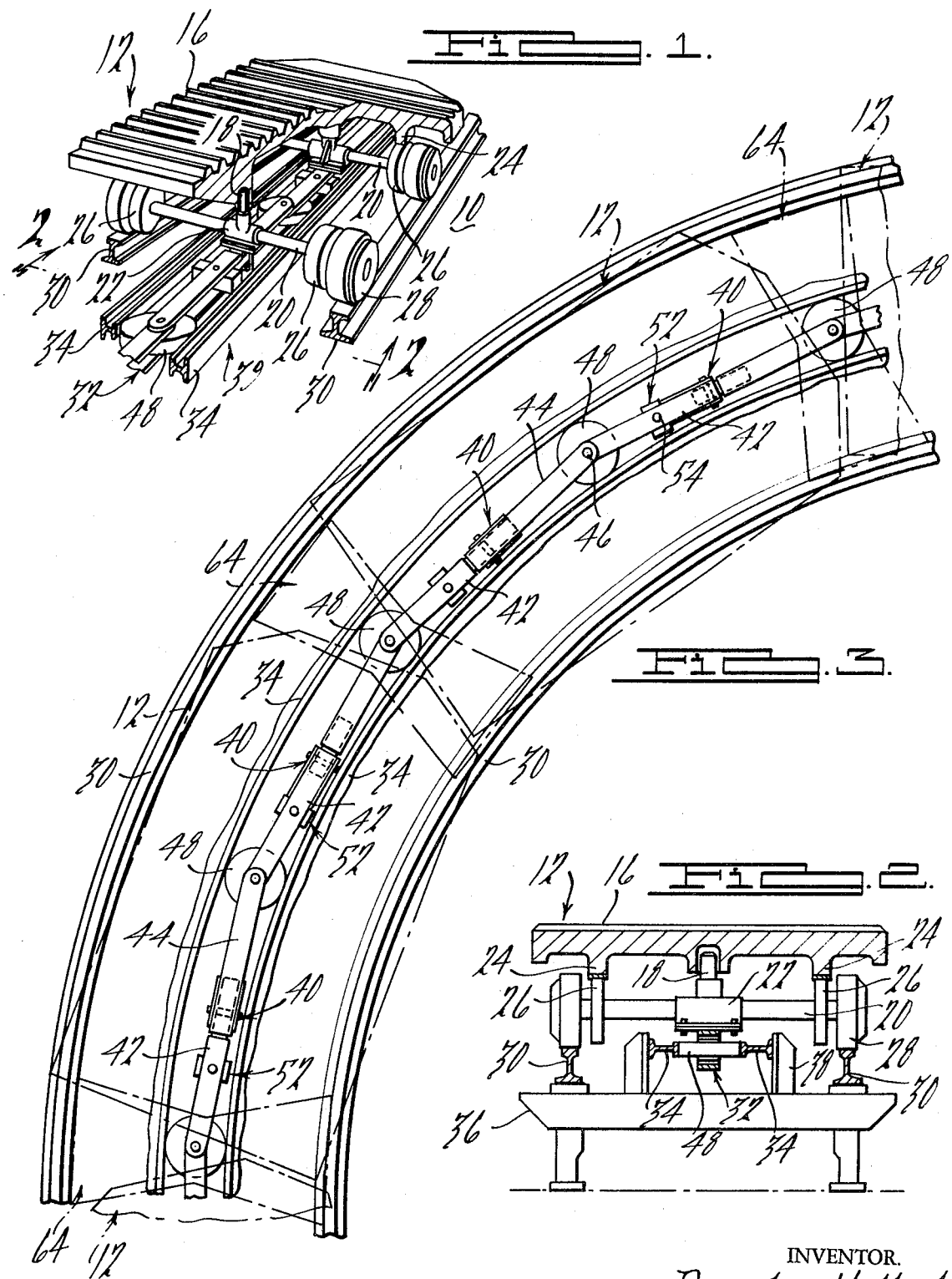
INVENTOR.
Dimitry Holbert
BY
Harness, Dickey & Pierce
ATTORNEYS

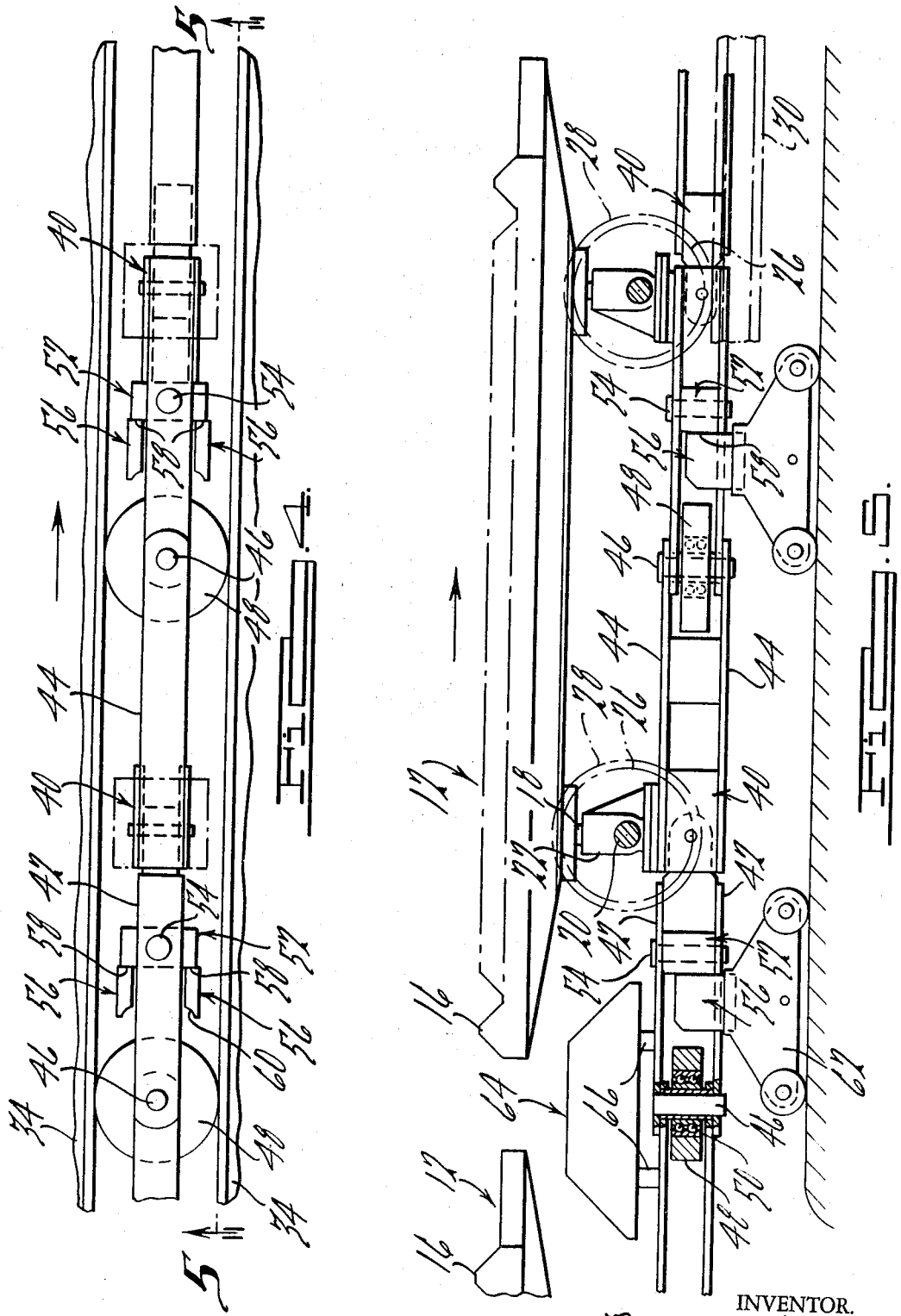

CONVEYOR

BACKGROUND AND SUMMARY OF THE INVENTION

This invention relates generally to conveyor chains for conveyor systems, for example, for a system like that disclosed in the patent to Czarnecki et al, U.S. Pat. No. 3,435,780, issued Apr. 1, 1969, and assigned to the assignee of this application. As shown in the above patent, conveyor chains are conventionally driven by driving members disposed on opposite sides of the chain which engage the arcuate surfaces of rollers carried by the chain. In some installations, for example, in foundries where the conveyor assembly may carry heavy molds between various levels of the foundry, very large driving forces are required to move the conveyor assembly. With large driving forces, the arcuate surfaces of the rollers develop laterally-outward forces tending to spread the driving members. In addition to the above undesirable tendency, the force of the driving members against the rollers is generally detrimental to the life of the bearings for the rollers. As a still additional disadvantage, the rollers must be sufficiently large in diameter to extend laterally outwardly of the driving members to provide a substantial surface component which is crosswise of the chain to efficiently receive the force of the driving members. As a result, the rollers tend to engage the guides for the chain during chording of the chain when a curved path of relatively small radius is negotiated.

The present invention solves the above problems by providing a laterally extending driven member or block on the chain which has flat surfaces disposed crosswise of the chain for engagement by the driving members of the drive means. Accordingly, substantially no laterally-outward forces are developed, and consequently, there is no tendency to spread the driving members. Furthermore, since the crosswise flat surfaces of the driven members may readily extend to the lateral extremities of the driven members, the driven members may be constructed with a lesser extension laterally of the chain than rollers used for this purpose so as to avoid engagement of the driven members with the guide rails of the chain during chording of the chain as it negotiates a curved path. Additionally, the bearings for the rollers no longer receive the driving force thereby providing increased roller bearing life. Preferably, the driven members are pivotally mounted to the chain so as to accommodate any angular misalignment between the driving members and driven members. Also, preferably, the driven members are mounted intermediate the pivot for the chain so that they may be removed for replacement or repair without dismantling of the chain.

In view of the above and the following detailed description of the preferred embodiment of this invention, it will be appreciated that the improved conveyor chain provided by this invention is a significant advance in this art.

BRIEF DESCRIPTION OF THE DRAWINGS

FIG. 1 is a perspective illustration of a mold car driven by an exemplary conveyor chain construction according to this invention;

FIG. 2 is an end cross-sectional view of the mold car and conveyor chain construction shown in FIG. 1;

FIG. 3 is a top view illustrating the manner in which the conveyor chain construction of FIG. 1 negotiates a curved path;

FIG. 4 is a top view of a conveyor chain construction of FIG. 1 showing the manner of engagement of the chain with driving dogs of a drive means for the conveyor chain; and FIG. 5 is a side view, partially in section, illustrating the mold car and conveyor chain construction of FIG. 1 showing the manner of engagement of the chain with driving dogs of a drive means for the conveyor chain.

DETAILED DESCRIPTION OF THE PREFERRED EMBODIMENT

In FIG. 1, an exemplary conveyor car and conveyor chain assembly is shown generally designated 10 which is suitable for use, for example, in a foundry for conveying molds to various molding operation locations. The assembly 10 may include a conveyor car generally indicated at 12 and a conveyor chain assembly generally indicated at 14. The conveyor cars 12 may comprise a top 16 on which conveyable articles are carried, for example, the molds for a molding operation. The car tops 16 are mounted on king pins 18 which are connected to the axles 20 by means of T-connectors 22. The car top 16, in addition to being mounted on the king pins 18, is also supported by downwardly extending flanges 24 which support the car top 16 on four bolster wheels 26. The bolster wheels 26 are free wheeling on the axle 20 and there is normally relative movement between the bolster wheels 26 and the flanges 24 only when the conveyor car 12 is negotiating turns. The conveyor car 12 moves along a path taken by the conveyor system by rolling on wheels 28 which are guided along a roadway or track for the conveyor car 12 consisting of a pair of rails 30. A chain 32, guided along a path provided by a pair of rails 34, drives or propels the cars 12 along the path defined by the rails 30. The rails 30 may be mounted on a bed 36 while the rails 34 may be mounted on vertical bed extensions 38.

The T-connector 22 is removably secured to a pivotal joint 40 of the chain 32 which provides for vertical articulation of the chain when the path defined by the rails 30 changes upwardly or downwardly. The universal joint 40 generally connects vertically spaced pairs of chain links 42 and 44 which pairs are pivotally connected by pins 46 to adjacent complementary pins of links 42 or 44. The pins 46 provide for horizontal articulation of the chain 32 when the guide rails 30 bend leftwardly or rightwardly in the horizontal plane, or a plane parallel to the car top 16. The pins 46 also carry rotatably mounted rollers 48 which are preferably mounted by bearings 50 as illustrated in FIG. 5. In the general arrangement as shown, a roller 48 is mounted intermediate each pair of adjacent conveyor cars 12 as well as centrally of each conveyor car 12.

Rectangular blocks 52 are carried by the chain 32 between the links 42 and extend laterally thereof, and are preferably mounted for limited rotation in a horizontal plane as by pins 54 extending through the links 42 and the blocks 52. The blocks 52 are disposed a predetermined distance forward of the nearest roller 48 so as to accommodate an upward arcuate movement of a pair of driving dogs or members 56 of a driving apparatus, only partially shown in FIG. 5. As can be best seen in FIG. 4, the blocks 52 have a pair of flat surfaces 58, each extending laterally from one side of the links 42 and being adapted to engage a corresponding flat surface on a driving dog 56. It will be appreciated that any angular misalignment between the flat surfaces on the dogs 56 and the driven blocks 52 are accommodated by pivotal movement of the blocks 52 about pivot 54. Thus, the driving force provided by the driving dogs 56 is transmitted to the chain 32 through the pivot pins 54. The rearward facing surfaces 50 of the driving dogs 56 may be arcuate in cross section so as to be adapted to fully engage the arcuate surfaces of the nearest rearward roller 48 upon coasting of the chain 32 after driving movement of the dogs 56 has ceased to limit such coasting movement of the chain 32 thereby facilitating relatively accurate positioning of the cars 12. As can be best seen in FIG. 3, the blocks 52 extend laterally of the chain links 42 a distance less than the lateral extension of the rollers 48 so as to prevent engagement of the blocks 52 with the rails 34 during chording of the chain 32 as it negotiates a curved path. The blocks 52 may have a lesser lateral extension than a roller used for this purpose since it provides a continuous crosswise surface to its lateral extremities while a roller used for this purpose has only a slight crosswise surface component near its lateral extremities, and accordingly, must be made correspondingly larger in diameter to provide a suitable engaging surface for the driving members. In the general arrangement of the conveyor as shown, each of the driven blocks 52 is positioned intermediate a pair of rollers 48, and particularly, between a roller 48 and a vertical articulation point 40.

As can be best seen in FIG. 5, the driving dogs 56 are mounted on rolling carriages 62 which are driven by a chain and motor assembly, for example, as illustrated in the aforementioned patent to Czarnecki et al, U.S. Pat. No. 3,435,780.

In one of its intended uses, the cars 12 carry sand molds for a foundry operation. To prevent any spilled sand from interfering with the bearings 50 and the rollers 48, a sand shield 64 is mounted intermediate the cars as by pins or studs 66 extending from the chain links 42 and 44 into receptacles in the sand shield 64 as shown. To accommodate the relative angular motion of the chain links 42 and 44 when the chain 32 negotiates a curved path, the receptacle for one of the pins 66 may be slotted or elongated. The sand shield 64 preferably slopes laterally as shown to deflect the sand to the sides of the conveyor 10. It may also have fore and aft bevels or slopes, if desired.

In view of the above description of an exemplary conveyor system 10 according to this invention, it will now be appreciated that an efficient driving engagement is provided between the drive dogs 56 and the driven blocks 52. Moreover, the bearings 50 supporting the rollers 48 are not carrying the driving forces, and therefore, are only forcibly loaded upon engagement of the rollers 48 with the guide rails 34 when negotiating a curved path and occasionally when the rollers 48 engage the guide rails 34 when the conveyor chain 32 is transversing a straight path. Accordingly, the service lie of the bearings 50 is benefitted. In addition to the above advantages, the driven blocks 52 may be easily removed for repair or replacement without dismantling the chain 32. It will be appreciated that this is a significant advantage as the difference in elevation between the different levels of a foundry may exert a force on the chain preventing convenient assembly of the chain after dismantling.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

What is claimed is:

1. In a conveyor chain assembly, a chain comprising connected pairs of spaced links, curved guide rails on opposite sides of said chain, a plurality of rollers carried by pins connected between said pairs of links and engageable with said guide rails as said chain passes therethrough, whereby intermediate portions of said links between said rollers will approach relatively closely to said guide rails, means for driving said conveyor chain assembly comprising a plurality of blocks disposed between said pairs of links, each block having a pair of planar surfaces extending laterally outwardly in opposite directions from said links, the extent of said surfaces being less than that which will cause engagement of said blocks with said guide rails during the chain assembly movement means for mounting said blocks for limited rotation with respect to said links at intermediate portions thereof between said guide rollers, and a forked driving apparatus having a pair of driving dogs movable into position on opposite sides of a pair of links with lateral planar surfaces engageable with the lateral surfaces on said blocks.

2. A conveyor chain assembly according to claim 1 wherein said chain is pivotally connected for vertical articulation intermediate said rollers.

3. A conveyor chain assembly according to claim 1 further including a plurality of conveyor cars carried by said chain.

4. A conveyor chain assembly according to claim 3 wherein said conveyor cars are serially mounted to said chain with one of said rollers intermediate adjacent ones of said conveyor cars.

5. A conveyor chain assembly according to claim 4 including a shield mounted intermediate said cars adapted to deflect material falling from said conveyor cars from said rollers intermediate said adjacent ones of said conveyor cars.

* * * * *